(12) United States Patent
Chen et al.

(10) Patent No.: US 9,040,137 B2
(45) Date of Patent: May 26, 2015

(54) PRINTABLE REUSABLE GEL FILM

(71) Applicants: Chia-Chen Chen, Taipei (TW); Hasting Genan Chen, Taipei (TW)

(72) Inventors: Chia-Chen Chen, Taipei (TW); Hasting Genan Chen, Taipei (TW)

(*) Notice: Subject to any disclaimer, the term of this patent is extended or adjusted under 35 U.S.C. 154(b) by 279 days.

(21) Appl. No.: 13/889,665

(22) Filed: May 8, 2013

(65) Prior Publication Data

US 2014/0335302 A1    Nov. 13, 2014

(51) Int. Cl.
| | | |
|---|---|---|
| B32B 3/26 | (2006.01) | |
| B21B 3/02 | (2006.01) | |
| B32B 25/00 | (2006.01) | |
| B32B 27/00 | (2006.01) | |
| B32B 27/06 | (2006.01) | |
| B32B 27/08 | (2006.01) | |
| B32B 3/02 | (2006.01) | |
| B32B 27/30 | (2006.01) | |
| G09F 3/02 | (2006.01) | |
| B32B 27/36 | (2006.01) | |
| C09J 7/02 | (2006.01) | |
| B32B 7/06 | (2006.01) | |

(52) U.S. Cl.
CPC ............. B32B 3/266 (2013.01); *B32B 27/306* (2013.01); *G09F 2003/023* (2013.01); B32B 27/08 (2013.01); *B32B 27/36* (2013.01); B32B 27/06 (2013.01); *G09F 2003/0201* (2013.01); *G09F 2003/0241* (2013.01); *B32B 27/304* (2013.01); *B32B 2367/00* (2013.01); *B32B 27/308* (2013.01); B32B 25/00 (2013.01); *C09J 7/02* (2013.01); *B32B 2329/04* (2013.01); *B32B 7/06* (2013.01); *B32B 2331/04* (2013.01); *B32B 2307/51* (2013.01); *B32B 2327/06* (2013.01); B32B 3/02 (2013.01)

(58) Field of Classification Search
None
See application file for complete search history.

(56) References Cited

U.S. PATENT DOCUMENTS

| | | | | |
|---|---|---|---|---|
| 5,421,942 | A * | 6/1995 | Hoffmann | 156/253 |
| 6,000,726 | A * | 12/1999 | Campbell | 283/81 |
| 6,294,250 | B1 * | 9/2001 | Date | 428/353 |
| 7,181,878 | B2 * | 2/2007 | Tucker | 40/638 |
| 2003/0012911 | A1 * | 1/2003 | Campbell | 428/40.1 |
| 2003/0026932 | A1 * | 2/2003 | Johnson et al. | 428/40.1 |

FOREIGN PATENT DOCUMENTS

JP          62260880 A * 11/1987 ............ C09J 7/02

OTHER PUBLICATIONS

English Abstract for JP 62260880 A, Nov. 1987.*

* cited by examiner

*Primary Examiner* — Aaron Austin
*Assistant Examiner* — Jeff Vonch
(74) *Attorney, Agent, or Firm* — Jackson IPG PLLC; Demian K. Jackson

(57) ABSTRACT

A printable reusable gel film formed of a polyvinyl acetic acid (PVA) or polyvinyl alcohol (PVOH) layer, a carrier layer, an acrylic adhesive layer, an elastic plastic sheet layer, an elastomer layer and a strippable plastic film is disclosed. The polyvinyl acetic acid (PVA) or polyvinyl alcohol (PVOH) layer and the carrier layer each have a protruding portion for guidance in printing. The strippable plastic film has perforations for ventilation to prevent accumulation of air during printing, assuring a high level of printing quality.

3 Claims, 6 Drawing Sheets

PRINTABLE REUSABLE GEL FILM

BACKGROUND OF THE INVENTION

1. Field of the Invention

The present invention relates to gel film technology and more particularly, to a printable reusable gel film formed of a polyvinyl acetic acid (PVA) or polyvinyl alcohol (PVOH) layer, a carrier layer, an acrylic adhesive layer, an elastic plastic sheet layer, an elastomer layer and a strippable plastic film, wherein the polyvinyl acetic acid (PVA) or polyvinyl alcohol (PVOH) layer and the carrier layer each have a protruding portion for guidance in printing; the strippable plastic film has perforations for ventilation to prevent accumulation of air during a printing operation.

2. Description of the Related Art

Conventional reusable gel films commonly have a certain thickness not suitable for printing patterns or designs directly. Further, these reusable gel films can easily become hardened after a period of time. Further, wishing to add patterns or designs onto a reusable gel film, it is necessary to print the desired patterns or designs on a thin film and then to adhere the printed thin film to the reusable gel film. However, when adhering the printed thin film to the reusable gel film, air bubbles may appear in between the printed thin film and the reusable gel film, resulting in a defective product. Further, the printed thin film and the reusable gel film may be separately provided by different providers or manufacturers. Delivery of the printed thin film and/or the reusable gel film between different places wastes much labor and time, increasing the cost.

SUMMARY OF THE INVENTION

The present invention has been accomplished under the circumstances in view. It is the main object of the present invention to provide a printable reusable gel film printable reusable gel film, which is formed of a polyvinyl acetic acid (PVA) or polyvinyl alcohol (PVOH) layer, a carrier layer, an acrylic adhesive layer, an elastic plastic sheet layer, an elastomer layer and a strippable plastic film. The printable reusable gel film has a thin thickness suitable for directly printing out desired patterns, enhancing convenience of printing and saving the product fabrication time.

It is another object of the present invention to provide a printable reusable gel film printable reusable gel film, which is formed of a polyvinyl acetic acid (PVA) or polyvinyl alcohol (PVOH) layer, a carrier layer, an acrylic adhesive layer, an elastic plastic sheet layer, an elastomer layer and a strippable plastic film, wherein the polyvinyl acetic acid (PVA) or polyvinyl alcohol (PVOH) layer and the carrier layer each have a protruding portion for guidance in printing; the strippable plastic film has perforations for ventilation to prevent accumulation of air during the printing operation, assuring a high level of printing quality.

It is still another object of the present invention to provide a printable reusable gel film printable reusable gel film, which can significantly reduce the shipping and warehousing and human working hours, lowering the cost.

It is still another object of the present invention to provide a printable reusable gel film printable reusable gel film, which reduces the defective rate and improves the product quality and yield.

It is still another object of the present invention to provide a printable reusable gel film printable reusable gel film, which is suitable for mass production, enhancing the competitiveness of products.

DETAILED DESCRIPTION OF THE INVENTION

Figure 1:
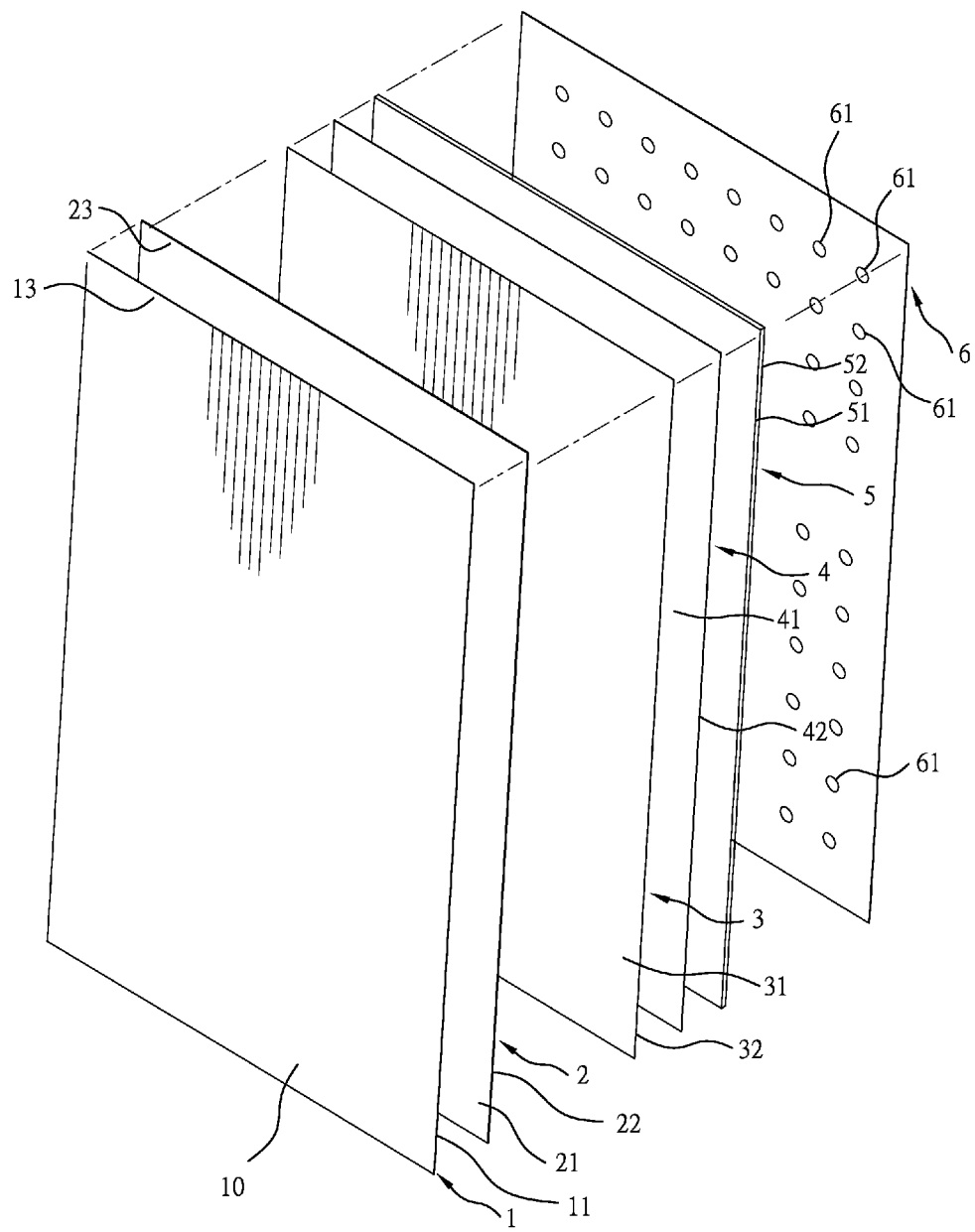
FIG. 1 is an exploded view of a printable reusable gel film in accordance with the present invention.
Figure 2:
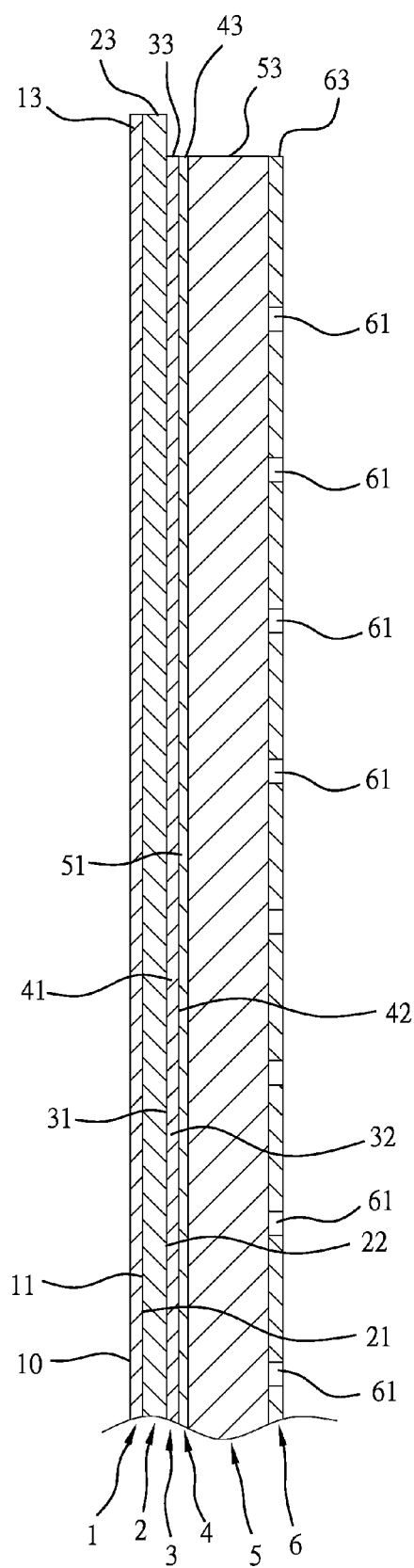
FIG. 2 is a sectional assembly view, in an enlarged scale, of the printable reusable gel film in accordance with the present invention.
Figure 3:
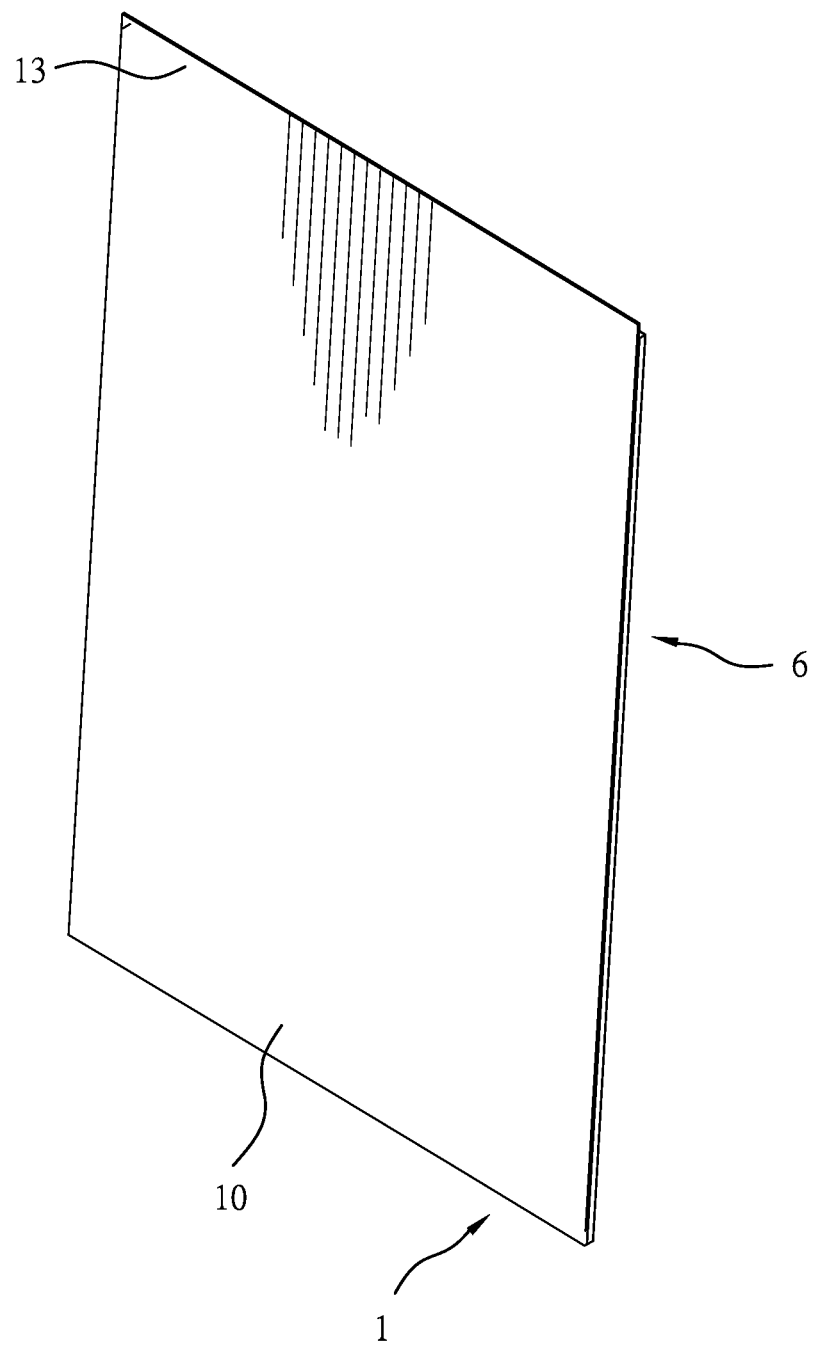
FIG. 3 is an elevational assembly view of the printable reusable gel film in accordance with the present invention.

Referring to FIGS. 1-4, a printable reusable gel film in accordance with the present invention is shown. The printable reusable gel film comprises:

a polyvinyl acetic acid (PVA) or polyvinyl alcohol (PVOH) layer 1 defining opposing front surface 10 and back surface 11 and having a wall thickness in the range of 0.01~0.07 mm, or preferably 0.01 mm;

a carrier layer 2 made of a plastic or paper sheet material having a wall thickness in the range of 0.05~0.15 mm, or preferably 0.1 mm and defining opposing front surface 21 and back surface 22, wherein the front surface 21 of the carrier layer 2 is bonded to the back surface 11 of the polyvinyl acetic acid (PVA) or polyvinyl alcohol (PVOH) layer 1;

an acrylic adhesive layer 3 having a wall thickness in the range of 0.01~0.03 mm and defining opposing front surface 31 and back surface 32, wherein the front surface 31 of the acrylic adhesive layer 3 is bonded to the back surface 22 of the carrier layer 2;

an elastic plastic sheet layer 4 made from polyvinyl chloride (PVC) or polyethylene terephthalate (PET) and having a wall thickness in the range of 0.01~0.05 mm and defining opposing front surface 41 and back surface 42, wherein the front surface 41 of the elastic plastic sheet layer 4 is bonded to the back surface 32 of the acrylic adhesive layer 3;

an elastomer layer 5 formed of a mixture of an elastomer solute and toluene solvent and coated on the back surface 42 of the elastic plastic sheet layer 4 using a paint-coating or spray-coating technique and having a wall thickness in the range of 0.05~0.5 mm and defining opposing front surface 51 and back surface 52, wherein the front surface 51 of the elastomer layer 5 is bonded to the back surface 42 of the elastic plastic sheet layer 4; and a strippable plastic film 6 covered on the back surface 52 of the elastomer layer 5 and having a wall thickness in the range of 0.03~0.08 mm, or preferably 0.05 mm and defining a plurality of perforations 61.

After the polyvinyl acetic acid (PVA) or polyvinyl alcohol (PVOH) layer 1, the carrier layer 2, the acrylic adhesive layer 3, the elastic plastic sheet layer 4, the elastomer layer 5 and the strippable plastic film 6 are bonded together, the finished printable reusable gel film has a thickness in the range of 0.2 mm~1.0 mm, or preferably 0.2 mm~0.8 mm.

Further, during fabrication, polyvinyl acetate or polyvinyl alcohol is mixed with 18%~32% water, and then added with boric acid or acetic acid to adjust PH value to about 4~5.5, and then the mixture is coated on the carrier layer 2 and fumed with ammonia to adjust PH value to about 6.5~7.0, forming the desired polyvinyl acetic acid (PVA) or polyvinyl alcohol (PVOH) layer 1 on the carrier layer 2. In the manufacturing process, the polyvinyl acetic acid (PVA) or polyvinyl alcohol (PVOH) layer 1 and the carrier layer 2 are bonded together to form a double-layer member; the acrylic adhesive layer 3, the elastic plastic sheet layer 4 and the elastomer layer 5 are bonded together to form a three-layer member; the double-layer member and the three-layer member are then bonded together to form a printable reusable gel film.

Figure 4:
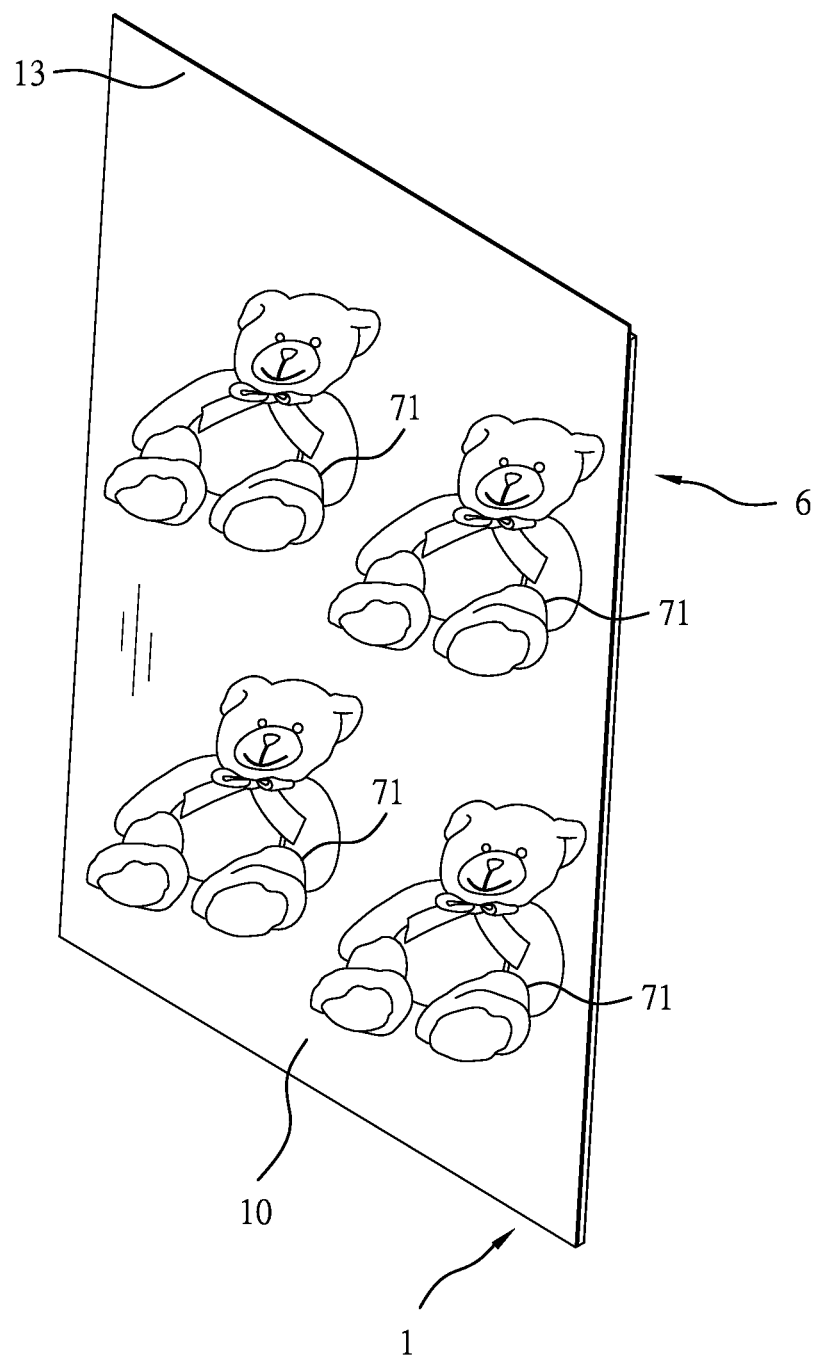
FIG. 4 illustrates a pattern printed on the front surface (free surface) of the polyvinyl acetic acid (PVA)/polyvinyl alcohol (PVOH) layer of the printable reusable gel film in accordance with the present invention.
Figure 5:
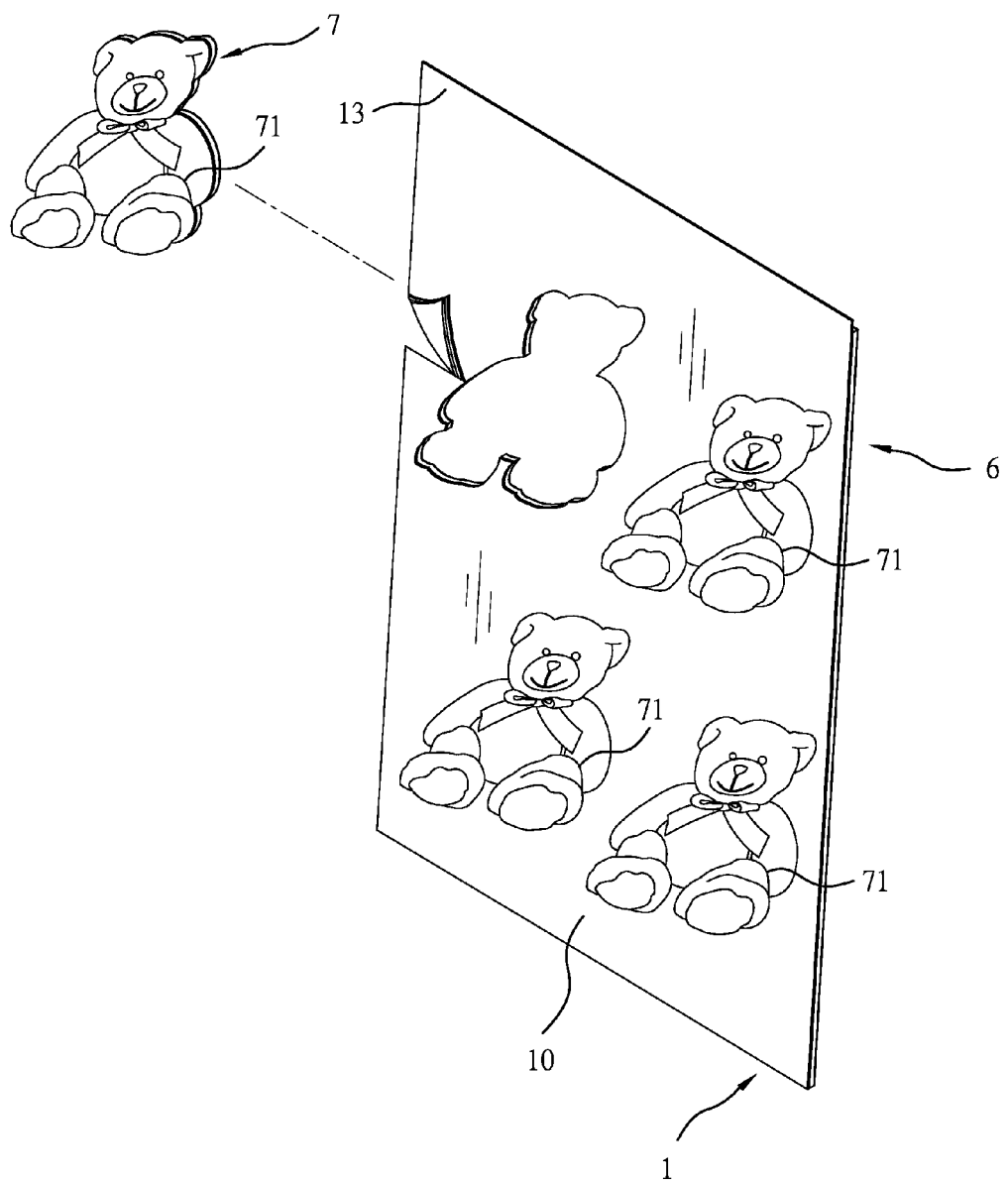
FIG. 5 illustrates a finished product cut out of the printed printable reusable gel film in accordance with the present invention.
Figure 6:
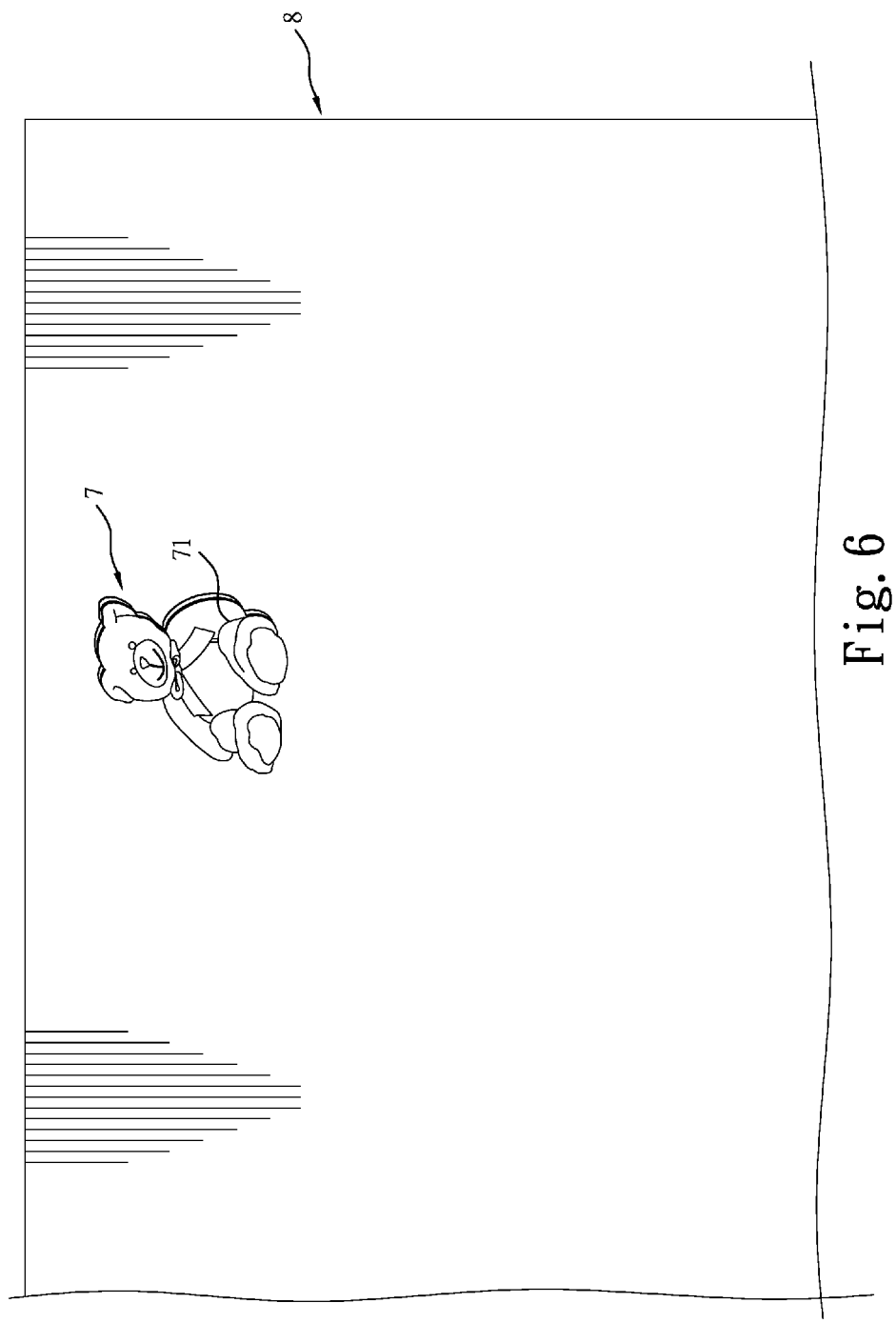
FIG. 6 illustrates one finished product obtained in accordance with the present invention adhered to a wall.

Setting the thickness of the printable reusable gel film in the range of 0.2 mm~0.8 mm facilitates printing patterns 71 on the front surface (free surface) 10 of the polyvinyl acetic acid (PVA) or polyvinyl alcohol (PVOH) layer 1 (see FIGS. 4, 5 and 6). A consumer can uses a scissors to cut a finished product 7 out of the printable reusable gel film along the border of one printed pattern 71 (see FIG. 5). The finished product 7 thus obtained can be directly adhered to a wall 8 (see FIG. 6) without a picture frame.

Further, the polyvinyl acetic acid (PVA) or polyvinyl alcohol (PVOH) layer 1 and carrier layer 2 of the printable reusable gel film each have a protruding portion 13 or 23 (see FIG. 2) protruding over one respective end edge 33 of the acrylic adhesive layer 3, one respective end edge 43 of the elastic plastic sheet layer 4, one respective end edge 53 of the elastomer layer 5 and one respective end edge 63 of the strippable plastic film 6 for use as guide means when the printable reusable gel film is being transferred through a printing press for printing. Further, the perforations 61 of the strippable plastic film 6 prevents accumulation of air when the printable reusable gel film is being transferred through a printing press, facilitating smooth printing operation and assuring a high level of printing quality.

Further, the elastomer layer 5 can be formed on the elastic plastic sheet layer 4 by attaching an elastic rubber sheet to the back surface 42 of the elastic plastic sheet layer 4 and then baked in a bake oven at 170° C.~220° C.

In conclusion, the printable reusable gel film of the present invention has the advantages and features as follows:

1. The combined thickness of the polyvinyl acetic acid (PVA) or polyvinyl alcohol (PVOH) layer 1, carrier layer 2, acrylic adhesive layer 3, elastic plastic sheet layer 4, elastomer layer 5 and strippable plastic film 6 of the printable reusable gel film is in the range of 0.2 mm~0.8 mm, facilitating direct printing of desired patterns.
2. The polyvinyl acetic acid (PVA) or polyvinyl alcohol (PVOH) layer and the carrier layer each have a protruding portion that works as guide means to guide printing, and the strippable plastic film has perforations for ventilation to prevent accumulation of air during printing, and therefore, the printable reusable gel film can be printed with high quality patterns smoothly.
3. The invention can significantly reduce the shipping and warehousing and human working hours, lowering the cost.
4. The invention can reduce the defective rate, thereby improving the product quality and yield.
5. The invention is suitable for mass production, enhancing the competitiveness of products.
6. After printing of patterns on the printable reusable gel film, the printed printable reusable gel film can be cut into multiple pieces of finished products. After removal of the strippable plastic film 6 from each finished product, each finished product can be repeatedly adhered to a wall 8 or the surface of any object without using a picture frame, enhancing practical value.

What is claimed is:

1. A printable reusable gel film
  a polyvinyl acetate (PVA) or polyvinyl alcohol (PVOH) layer defining an opposing front surface and back surface, said polyvinyl acetate (PVA) or polyvinyl alcohol (PVOH) layer comprising a protruding portion extended from end thereof;
  a carrier layer defining an opposing front surface and back surface, the front surface of said carrier layer being bonded to the back surface of said polyvinyl acetate (PVA) or polyvinyl alcohol (PVOH) layer, said carrier layer comprising a protruding portion extended from one end thereof and bonded to the protruding portion of said polyvinyl acetate (PVA) or polyvinyl alcohol (PVOH) layer, wherein the protruding portion of said polyvinyl acetate (PVA) or polyvinyl alcohol (PVOH) layer and the protruding portion of said carrier layer protrude over one respective end edge of said acrylic adhesive layer, one respective end edge of said elastic plastic sheet layer, one respective end edge of said elastomer layer, and one respective end edge of said strippable plastic film;
  an acrylic layer defining an opposing front surface and back surface, the front surface of said acrylic layer being bonded to the back surface of said carrier layer;
  an elastic plastic sheet layer made from polyvinyl chloride (PVC) or polyethylene terephthalate (PET) and defining an opposing front surface and back surface, the front surface of said elastic plastic sheet layer being bonded to the back surface of said acrylic adhesive layer;
  an elastomer layer formed of a mixture of an elastomer solute and toluene solvent and coated on the back surface of said elastic plastic sheet layer; and
  a strippable plastic film covered on one side of said elastomer layer opposite to said elastic plastic sheet layer, said strippable plastic film comprising a plurality of perforations.

2. The printable reusable gel film as claimed in claim 1, the combined thickness of said polyvinyl acetate (PVA) or polyvinyl alcohol (PVOH) layer, said carrier layer, said acrylic adhesive layer, said elastic plastic sheet layer, said elastomer layer, and said strippable plastic film layer is in the range of 0.2 mm~0.8 mm.

3. The printable reusable gel film as claimed in claim 1, wherein said elastomer layer is formed of an elastic rubber sheet being attached to the back surface of said elastic plastic sheet layer and then baked in a bake oven at 170° C.~220° C.

* * * * *